United States Patent
Griswold et al.

[15] 3,673,853
[45] July 4, 1972

[54] GAS CONTENT OF LIQUID DETERMINATION

[72] Inventors: Augustus W. Griswold, Rochester; James R. Tompkins, Greece, both of N.Y.

[73] Assignee: Sybron Corporation, Rochester, N.Y.

[22] Filed: May 11, 1970

[21] Appl. No.: 36,305

[52] U.S. Cl. .................................................73/19, 73/64.2
[51] Int. Cl. .........................................................G07n 7/14
[58] Field of Search ..............................73/61, 64.2, 53, 19

[56] References Cited

UNITED STATES PATENTS

| | | | |
|---|---|---|---|
| 2,102,105 | 12/1937 | Zahm | 73/19 |
| 2,603,086 | 7/1952 | Ingham, Jr. et al. | 73/19 |
| 2,736,190 | 2/1956 | Bockelmann et al. | 73/19 |
| 2,736,191 | 2/1956 | Bockelmann et al. | 73/19 |
| 3,077,765 | 2/1963 | Dijkema | 73/19 |

FOREIGN PATENTS OR APPLICATIONS 1,278,762 9/1968 Germany ....................................73/19

*Primary Examiner*—Louis R. Prince
*Assistant Examiner*—Joseph W. Roskos
*Attorney*—Theodore B. Roessel

[57] ABSTRACT

In a continuous liquid carbonation process, a pump draws liquid from a line and pumps it back in again. Periodically, the connections of the pump to the line are shut-off, trapping a sample of carbonated liquid in the pump, which agitates same, causing $CO_2$ to evolve into a vapor space. Such agitation eventually causes the sample to become an equilibrium mixture of free $CO_2$ and liquid solution of $CO_2$. Pressure and temperature measurements on the equilibrium mixture allow calculation of the $CO_2$ content. The calculation can be carried out automatically and used for automatically controlling the carbonation of the liquid.

12 Claims, 8 Drawing Figures

INVENTORS
AUGUSTUS W. GRISWOLD
JAMES R. TOMPKINS

INVENTORS
AUGUSTUS W. GRISWOLD
JAMES R. TOMPKINS

GAS CONTENT OF LIQUID DETERMINATION

BACKGROUND OF THE INVENTION

The present invention relates to carbonization of potables, such as soft drinks and alcoholic beverages, in particular, to determination, i.e., measurement and/or control of $CO_2$ content of such potables. More generally, the invention relates to determination of gas content of liquids or like flowable material capable of dissolving gases.

In the prior art, the potables industries have long relied on the bottle method to measure $CO_2$ content of beer and the like. In this method, a bottle or equivalent, equipped with pressure gauge and thermometer, is filled to predetermined degree with the potable, sealed, and shaken. Temperature and pressure readings are then made. A so-called Zahm chart, which is in effect a phase-diagram for equilibrium mixtures of the particular potable and $CO_2$, which relates temperature and pressure with $CO_2$ content, is then referred to for a reading of $CO_2$ content.

SUMMARY OF THE INVENTION

The present invention is an improvement in the aforesaid bottle method, and encompasses improved apparatus which provides something like continuous measurement of $CO_2$ content of potables. In particular, a flow of liquid passing through a pipe line from a suitable known type of carbonator to a utilization means, such as bottling machinery, or the like, is sampled by a pump at a point in the line where the $CO_2$ content is such as will obtain in the utilization means. The pump has its intake and exhaust connected to by-pass a fraction of the line flow through the pump, which may be operated substantially continuously. Periodically, the pump's intake and exhaust are simultaneously cut-off from the line. The pump continues to operate, and there is liquid trapped in the pump. At this point the internal volume of the pump is solidly filled with liquid, so a vapor space is next provided for the liquid in the pump. The pumping action inherently agitates the liquid, so $CO_2$ from the liquid in the pump evolves into the vapor space. After the pumps action has continued for such time as is necessary to bring the contents of pump and vapor space to equilibrium, measurement of vapor pressure and temperature of such contents provide values for reading $CO_2$ content of the liquid from a Zahm chart, or calculating same from some equation combining Boyle's and Charles' laws. The pump's intake and exhaust may then be opened to the line again for returning the contents of the pump and vapor space to the line. Ordinarily, the freed $CO_2$ passes back into solution and the former contents of the pump continue on to the utilization means. The vapor space is, of course, eliminated till a new sample is taken and trapped in the pump.

In the apparatus according to the invention, the pump is shut-off from the line by valve means which simultaneously connect the pump's intake and exhaust to a chamber which adds a predetermined volume to the volume in the pump. Prior to the shut-off, the pump's internal volume is solidly filled with liquid, and there is substantially no free $CO_2$ therein. The said chamber, however, increases the pump's internal volume by a certain amount of empty space, so while the pump is agitating the original volume of liquid, the pump's effective internal volume is now larger than the original volume of liquid, so the extra volume is taken up by evolved $CO_2$ (and other vapors from the liquid, of course, e.g., $H_2O$).

Preferably, the said chamber is provided by a pressure-movable wall, such as a diaphragm, piston, or the like, which is deformed by the vapor pressure developed by the trapped liquid, and thereby creates the aforesaid chamber in effect. In order to avoid complicating calculation by variation in chamber volume, the deformation is caused always to result in the same chamber volume.

Since the deformation is developed by the pressure on the pressure-responsive element, the latter can exert a force due to the $CO_2$ pressure. In the present invention, this force is counter-balanced when the deformation has attained a given chamber volume. Consequently, the counter-balancing force becomes a measure of the pressure developed by the gases and vapors from the trapped liquid.

In particular, the chamber is defined by a cavity in a rigid body, which cavity is closed by the pressure movable wall. Until about the time the pump is shut-off from the line, the cavity presents zero volume to the intake and exhaust connections of the pump. Valves in these connections are moved to simultaneously develop an initial predetermined cavity volume filled with liquid and cut ingress and egress of liquid to the line the instant the initial cavity volume exists. The vapor pressure of the agitated trapped liquid forces the wall to move outwardly of the cavity, further increasing the volume of the cavity. When the wall has moved a predetermined extent, external fluid pressure is applied to it at such level as to just stop it from moving out any further. This level of external pressure is then taken as a measure of the pressure forcing the wall outwardly of the cavity and, therefore, of the pressure of the sample, which is now a mixture of liquid and gas.

BRIEF DESCRIPTION OF THE DRAWINGS

In FIG. 1, a conduit P conducts liquid having gas dissolved therein in the direction indicated by the arrows. It is to be supposed that the liquid solidly fills the interior of the illustrated portion of the conduit. Ordinarily, the liquid would come from apparatus in which gas under pressure is injected into the liquid which is then pumped under pressure into the pipe for transfer of the liquid to containers, such as cans, bottles, barrels, or the like, downstream from the illustrated portion of conduit. However, whence the gasefied liquid originates, its composition and uses, and where it ultimately goes, are not critical to operation of our novel gas content of liquid measuring device.

Figures 1, 2:
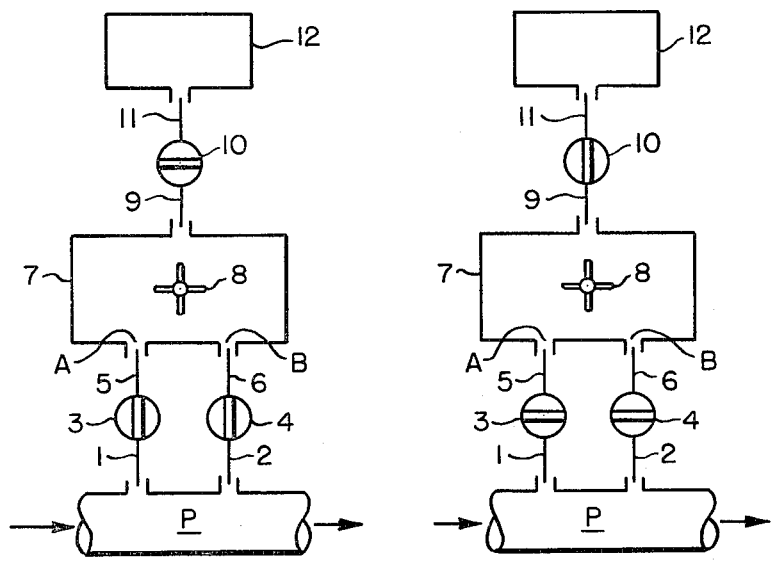
FIGS. 1 and 2 show the invention in a form wherein vapor space for evolved gas is provided by a chamber connectable to the interior volume of the pumps and illustrate the operation of the invention.

Conduits 1 and 2 provide fluid-conducting passages between conduit P and respective valves 3 and 4. Conduits 5 and 6 provide fluid-conducting passages between respective valves 3 and 4 and a chamber 7 having an impeller 8 in the interior space of the chamber.

A conduit 9 provides a fluid-conducting passage interconnecting chamber 7 and a valve 10, and a conduit 11 provides a fluid-conducting passage interconnecting valve 10 and a chamber 12.

Each of valves 3, 4 and 10 are operable to one of two states. In one state, it is open, that is to say, provides a fluid-conducting passage interconnecting the fluid-conducting passage provided by the respective conduits interconnected by the valve in question. In the other state, it is closed, that is to say, it isolates, from each other, the fluid-conducting passages provided by the respective conduits interconnected by the valve.

As indicated by the conventional symbolism used in the drawing to depict the valves, in FIG. 1, valves 3 and 4 are open, and valve 10 is closed. In FIG. 2, which shows the identical apparatus of FIG. 1, valves 3 and 4 are closed and valve 10 is open.

In FIG. 1, therefore, the interior space of chamber 7 communicates freely with the interior space of conduit P. On the other hand, the interior spaces of chambers 7 and 12 are isolated from each other. In FIG. 2, of course, just the opposite conditions obtain.

In the measurement according to the invention, the operation of the apparatus is a sequence of basic states corresponding to FIGS. 1 and 2, in that order.

In the FIG. 1 state of operation, the interior space of chamber 12 is empty. Impeller 8, however, energized by means not shown, is creating a differential fluid pressure between two places A and B in the interior space of chamber 7. Places A and B are shown as the regions where conduits 5 and 6 open into the interior space of chamber 7. This differential pressure, of course, both draws liquid out of conduit P and into chamber 7, and forces this liquid out of chamber 7 into conduit. Considering the direction of flow in conduit P, it is convenient to take place A as where the liquid is taken into the interior space of chamber 7, and place B as where it is forced out of the chamber and back into pipe. In other words, gasefied liquid, in this first state of operation, is circulated in a closed circuit defined by conduit P, conduit 1, valve 3, conduit 5, chamber 7, conduit 6, valve 4 and conduit 2, and in the direction corresponding to the order of enumeration of the parts of the closed circuit. Chamber 7 and impeller 8, therefore, define a pump, the suction or intake side being provided at A where there is a relatively low pressure region, and the compression or outlet side being provided at B where there is a relatively high pressure region, the respective regions being created by the action of impeller 8 on fluid in the chamber 7.

It is to be supposed that the total interior space in the above said closed circuit is solidly-filled with gasefied liquid, i.e., contains no bubbles or voids. Since this liquid is first taken out of the general flow through conduit P and then injected back into it, and the closed circuit is solidly filled, then supposing this general flow to be continuous in the direction indicated, and supposing the impeller continuously energized to circulate liquid in the sense indicated, then at every instant the liquid in the interior space of chamber 7 is identical in gas content to the main body of liquid then in the interior space of the illustrated portion of conduit P. In other words, in the state of FIG. 1, the apparatus is continually sampling the liquid in conduit P.

To test the gas content of this continuous sample, the apparatus is next put into the state shown in FIG. 2. In this second state, impeller 8 continues to operate, and indeed everything is the same except for the states of valves 3, 4 and 10. Obviously, now the interior space within chamber 7 communicates with the interior space of chamber 12, which was previously characterized as "empty". Ideally, empty would mean evacuated of all gas, liquid, or other fluid or vapor pressure exhibiting material. For explanation purposes, however, it is only necessary to assume that gas or vapor pressure in the return space of chamber 12, prior to opening valve 10, is known and is less than the vapor pressure that could exist were it totally evacuated and then valve 10 opened.

Impeller 8 is necessarily some sort of device exerting mechanical forces on the liquid in chamber 8. In FIG. 1, of course, these forces are transformed into transferring the liquid through the chamber, out of place B and into place A. Due to the solid fill in the FIG. 1 state, these forces cannot cause gas bubbles or voids to develop in the liquid.

In FIG. 2, however, these forces continue to move the liquid in chamber 7 while the trapped liquid cannot go anywhere, there is now the "empty" interior space in liquid 12 open to it. This being the case, the action of impeller 8 agitates the liquid which not only releases its own vapor into chamber 12, but also gives up some of its gas content, and forms a gas-liquid mixture which quickly comes into pressure and temperature equilibrium as to its components and with the surrounding structure of the pump and chamber.

If we suppose the liquid is carbonated, and is bottled, then chambers 7 and 12, in FIG. 2, form a filled bottle of the usual sort, where chamber 7 represents the body of the bottle and chamber 12 represents the vapor space in the neck of the bottle. Also, since impeller 8 is operating, in effect, the bottle is being shaken. Therefore, by making the temperature and pressure measurements referred to in BACKGROUND OF THE INVENTION, supra, and referring to the chart of the therein-described sort, the $CO_2$ content of the liquid in the "bottle" can be determined.

However, unlike the classical bottle-shaking test, the apparatus of FIGS. 1 and 2, can be practically immediately caused to shake a new bottle full. Essentially, this is just a matter of operating valves 3, 4 and 10 back to the FIG. 1 state (and, of course, restoring the interior space of chamber 12 to its FIG. 1 state of emptiness, as by, for example, momentarily connecting chamber 12 to a vacuum chamber or pump, after valve 10 closes again). In the FIG. 1 state, the evolved gas goes back into solution (and to line pressure) and the liquid in chamber 7 is swept back into pipe P and on toward the plane of utilization. As liquid formerly upstream of conduit 1 now enters the pump, the FIG. 2 state can be established again and a new measurement made.

The frequency of occurences of the state of FIG. 2 is limited by how long it must be maintained to make the pressure and temperature measurement, and how long the state of FIG. 1 must be maintained, following the next-previous FIG. 2 state, to make sure that the liquid from the latter has been forced back into conduit P and replaced by liquid truly representing gasefication of the liquid coming into the illustrated portion of conduit P.

Making the measurement in the FIG. 2 state obviously requires holding the liquid long enough to bring the free gas, dissolved gas, liquid vapor and liquid phase system into equilibrium. The time involved may be minimized by having the total volume within chambers 7 and 12, conduits 2, 6, 9 and 11, and valve 10 small, and the total volume within chamber 7, conduits 9 and 11, and valve 10, small in comparison to the former said volume. Naturally, impeller 8, chamber 7 and conduits 5, 6 and 9 should be constructed so that the action of impeller 8 does completely empty and solidly fill the corresponding volume each time the measuring sequence is carried out.

The time this aforesaid measuring sequence takes may also be reduced by using pressure and temperature measuring apparatus automatically performing the computation corresponding to making the previously-referred to pressure-temperature gas content chart.

Chamber 7 and impeller 8 may be provided by one or another of various types of conventional pumps, as long as it can be provided with a connection corresponding to conduit 9 for allowing egress of vapor and gas from the liquid trapped in the pump in the FIG. 2 state and agitating the liquid in such a way as to produce the desired phase equilibrium.

Preferably (and as the showing of impeller 8 hints) a centrifugal pump is used. This type of pump is very simple, and can be constructed so that its impeller (which is a sort of rotary fan) takes up as much of the space within the pump as is desired, and can be driven by a motor magnetically coupled to the impeller, so that the interior of the space within the pump is totally isolated from external volumes, save as valves 3, 4 and 10 may be operated to provide for fluid ingress and (or egress to and/or from the interior space in the pump, i.e., the space represented by the interior space of chamber 7).

The advantages of a pump are that it takes a sample, and shakes, purges and returns it to conduit P merely as a consequence of pumping, and the operation of valves 3, 4 and 10. Also, there is nothing critical about its performance specification, so long as it is able to pump hard enough to get the old liquid sample back into the line. This is not very difficult, especially if, as FIGS. 1 and 2 suggest, the outlet of the pump is just a little downstream of the inlet. In practice, the pump can return the sample to substantially the same place it got it from. Normally, the flow out of the line to chamber 7 is so small in mass-rate compared to the main flow through the line, that there would be no danger of contaminating fresh samples with old samples.

Further, according to the invention, chamber 12 is provided in the form of a variable chamber, the interior volume of which can be varied from substantially zero to any predetermined non-zero value, and vice versa.

Figure 3:
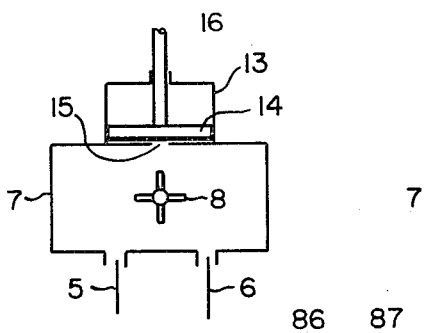
FIGS. 3 and 4 are like FIGS. 1 and 2, except that the vapor space is provided by a piston and cylinder arrangement.

Thus, in FIG. 3, the variable chamber is represented by a cylinder 13 having a piston 14 therein. Piston rod 16 provides for positioning the piston at various levels in the cylinder. The bottom of the cylinder is simply the top of chamber 7, and conduit 9 is represented by a more or less zero-length fluid-conducting passage 15 through the top of chamber 7. In FIG. 3, piston 14 is seated substantially flush on the bottom of cylinder 13, providing zero-interior space. This corresponds to FIG. 1, with the interior space of chamber 12 totally evacuated. In effect, piston 14 is the same as valve 10, since it closes passage 15. Actually, it is contemplated here that there is literally no interior space volume at all in cylinder 13 at this stage.

Figure 4:
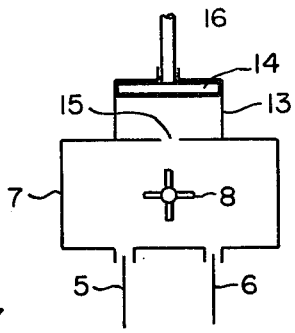

In FIG. 4, piston 14 is all the way up to the top of cylinder 13. Now cylinder 13 corresponds literally to chamber 12 totally evacuated, although naturally no actual total evacuation is contemplated, or occurs, since gas and vapor from the liquid in chamber 7 will fill it.

The application of FIGS. 3 and 4 to FIGS. 1 and 2 is obvious. Briefly, however, the modification, as shown in FIG. 3, replaces chamber 12, valve 10 and conduits 9, 10 and 11 of FIG. 1, with cylinder 13 and piston 14. In other words, the operating state represented by FIG. 1 is carried out with zero volume connected, at the top of chamber 7, to the interior space within chamber 7.

Also, the piston and cylinder modification, as shown in FIG. 4, replaces chamber 12, valve 10 and conduits 9, 10 and 11, in FIG. 2. In other words, the operating state represented by FIG. 2 is carried out with what amounts to the totally-evacuated interior space of chamber 12 connected, at the top of chamber 7, to the interior space within chamber 7.

Piston 14 is not moved from the bottom of cylinder 13 to the top until valves 3 and 4 are closed, otherwise liquid would be forced into the cylinder. With valves 3 and 4 closed, however, moving piston 13 to the top of cylinder 14 creates a vapor space which quickly comes to equilibrium with a mixture of liquid vapor and gas evolved due to the action of impeller 8, and of the negative pressure effect caused by piston 13 moving up. The piston is to be supposed to fit the cylinder without appreciable leakage between piston and cylinder-wall.

To go back to the operational state represented by FIGS. 1 and 3, the valves 3 and 4 are opened and the piston 14 then is pushed down to the bottom of cylinder 13. The impeller forces the old sample back into the line, including the evolved gas which, of course, begins to go back into solution again, and shortly the chamber 7 becomes entirely filled with a new sample so that the apparatus is ready to go to the FIGS. 2 and 4 state once more.

Figure 5:
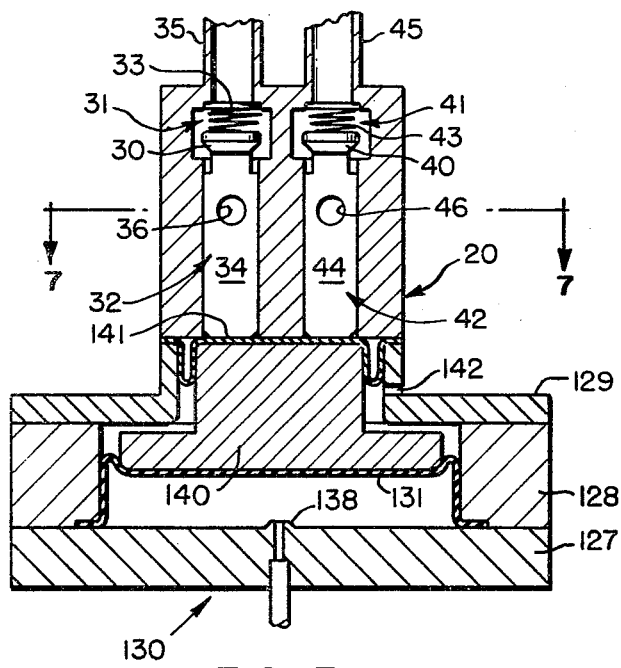
FIGS. 5, 6 and 7 are various views, to scale, of a form of the invention embodying, in effect, the essence of FIGS. 3 and 4, as expressed in an actual working embodiment of the invention.
Figure 6:
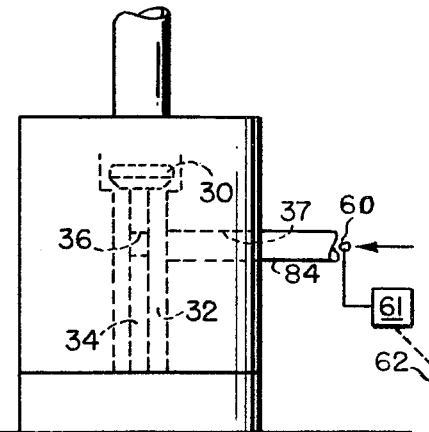
Figure 7:
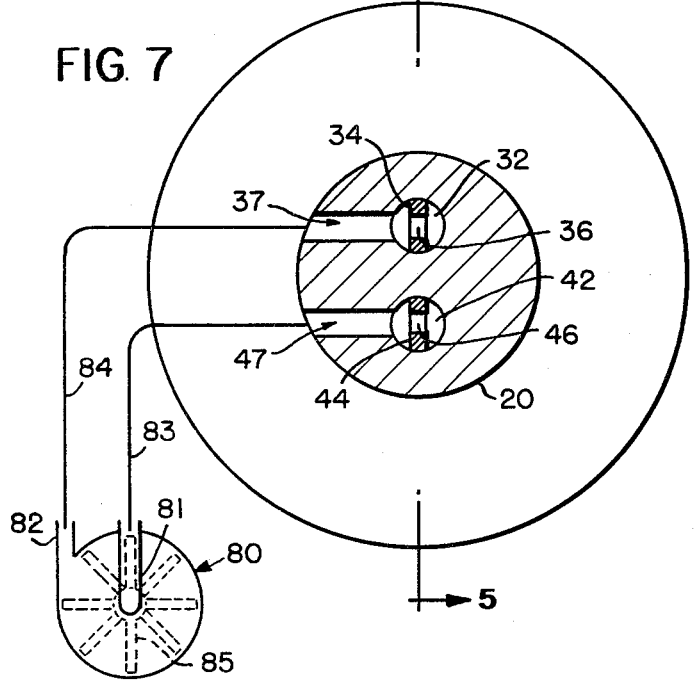

Actual embodiments of the invention are preferably modeled after the species of FIGS. 3 and 4. One such embodiment is shown in FIGS. 5, 6 and 7, which show all material proportions in their correct measure (but about ¾'s life size). Static detail such as clamping rings, flanges and bolts, however, have been omitted or simplified, for clarity and accordance of mechanical commonplaces.

In FIG. 5, valves 30 and 40 correspond to valves 3 and 4 of the other Figures. Valve 30 is contained in a chamber 31 in a body 20 which also has a similar chamber 41 therein containing valve 40. The lower end of body 20 is flat, and parallel to the flat upper end of a body 140, corresponding to piston 14. A rubber or other impervious flexible material diaphragm 141 of uniform thickness separates the two bodies.

Right cylindrical bores 32 and 42 open at one end into the chambers 31 and 41, respectively, and at the upper surface of diaphragm 141.

Compression springs 33 and 43, in chambers 31 and 41, respectively, urge the valves 30 and 40 downwardly. Valves 30 and 40 have stems 34 and 44, respectively, fixed thereto. As shown, the lower ends of the stems seat on diaphragm 141, and the stems are long enough to hold the conical lower peripheries of the valves spaced from the sharp-edged circular openings formed by the junctions of bores 32 and 42 with chambers 31 and 41, respectively.

The upper portions of chambers 31 and 41 have conduits 35 and 45, respectively, for connecting chambers 31 and 41 to a conduit P, as in the preceding Figures, being more or less equivalent to conduits 1 and 2, respectively. With the valves positioned as shown, the clearances of parts is to be supposed such as to allow liquid to flow freely, via chambers 31 and 41, between conduit 35 and bore 32, and between conduit 45 and bore 42, respectively.

As shown, the stems 34 and 44 are slab-like, and have passages 36 and 46. In effect, the stems are right-cylinders substantially exactly fitting their respective bores, but cut away to allow liquid free access to all parts of the bores via the passages 36 and 46. The stems, of course, are nevertheless thick enough so what cylindrical surface they have allow the stems to move freely in the bores, without, however, cocking from the positions shown, or binding.

Body 20 also has bores 37 and 47 (see FIG. 7) opening into bores 32 and 42, respectively, and more or less corresponding to conduits 5 and 6 in the previous Figures. However, as shown in FIG. 7, a centrifugal pump 80 has its intake 81 and its outlet 82 connected by conduits 83 and 84, respectively, to bores 37 and 47, respectively. The usual impeller or fan 85 of the pump 80 corresponds to impeller 8 of the earlier Figures.

This arrangement, in effect, distributes the space within casing 7 of the preceding Figures into three structurally distinct parts, but there is no basic functional distinction for the three parts, namely, the volume in bore 32, the volume in bore 42, and the internal volume within pump 80 are always connected for free circulation of fluid throughout the combined volume of the three parts. However, the structural arrangement provides for automatic operation of valves 30 and 40, in contrast to the assumed manual operation of their counterparts, valves 1 and 2 of the preceding Figures.

Thus, if the body 140 is moved downwardly from the position shown in FIG. 5, springs 33 and 43 will make their respective valves follow. Naturally, the said position has to be maintained by suitable means, until such times as it is desired to make a measurement. Preferably, this is done in such fashion as to provide also for measurement of the pressure of the gas evolved when, as will be described in particular later, the device of FIGS. 5, 6 and 7 is in the state corresponding to FIG. 4 hereof.

For example, and as shown, the body 140 is held in the position by air pressure. Thus, we provide the body 130 composed of three parts, 127, 128 and 129, and having a diaphragm 131 for defining an expansible chamber. The diaphragm 131 is similar to diaphragm 141, but of larger area, and sits flush against the lower surface of the body 140. The space between the diaphragms is vented to the external atmosphere at 142.

By reason of the diaphragms, the bodies 130 and 140 define a piston and cylinder arrangement corresponding to that of FIGS. 3 and 4, except that, as shown in FIG. 5, a differential effect will result due to the different effective areas of the opposite sides of the piston. It is to be remarked that this effect is not essential. The reason for it is that the actual device according to FIGS. 5, 6 and 7 is likely to be used under circumstances where pressure levels at opposite sides of the piston are such that it is convenient to give the pressure under the piston more effective area to work upon than is given to the pressure on the upper side of the piston. In other words, the diaphragms 141 alone would suffice if provided with a rigid central portion (in effect, the upper part of body 130) fixed thereto.

In any event, the space within body 130 and under diaphragm 131 has conduits 132, 133 and 134 connecting it to respectively, a source 135 of air under pressure, of say 20 pounds per square inch gauge, filtered and regulated, and so forth, as is usual with pneumatic instrumentation; the atmosphere external to the body 130, via a valve 136; and to a pneumatic instrument, generally indicated by the reference character I, via a valve 137.

Ordinarily, instrument I, which may be a pressure gauge, pressure-operated controller, or pressure recorder, will include something like a bellows 50, under the compression of a spring 50, so that a measure of the difference between the pressure inside the bellows and the pressure outside the bellows is given by the extent to which the bellows is compressed.

Thus, assuming a measure of evolved gas pressure to have been made in the past, and valve 137 then closed, as shown, the compression of bellows 50 is a measure of this pressure. Suitable linkage 52, connected to the bellows, reflects this measure and positions some element of mechanism M to move an indicator, position a control valve, and/or the like, so that the operation of mechanism M reflects the pressure in bellows 50.

As valve 136 is also closed in FIG. 6, it is evident that the full supply pressure is acting on diaphragm 131. Conduits 32 and 42 are connected to the source P but this, it is to be supposed, does not exert enough pressure on top of diaphragm 141 to prevent the supply pressure from holding body 140 in the position shown in FIG. 5.

As shown, conduit 133 communicates with the space under diaphragm 131 via a so-called nozzle 138. The nozzle projects a little above the bottom inner surface of the space within body 130 so that if body 140 is forced down it would seemingly seal the opening of the nozzle by forcing diaphragm 131 against the upper opening of the nozzle.

To lower the body 140, valve 136 is opened, allowing air to vent to the external atmosphere via the nozzle 138 and conduit 133, nozzle, valve and conduit being dimensioned so as to enable the air under the diaphragm to escape more or less freely to atmosphere. However, when body 140 comes down it does not quite seal the nozzle with diaphragm 131, because when the diaphragm gets to within a few thousandths of an inch of the nozzle opening, it impedes air flow through the nozzle opening. When this happens, the pressure under the diaphragm, which had been dropping well below supply pressure due to free escape through the nozzle, begins to increase again.

It is evident that ultimately (usually, more or less instantly) the body 140 establishes itself at just such a position that the escape of air is at just that rate necessary to maintain the pressure under the diaphragm at a level where the upper force due to pressure on body 140, is just equal, to the downward force due to pressure on body 140 (plus, or minus, of course, such other forces as may exist, due to weight of parts, and what not, which may be taken as constants in any given case).

At this point, valve 137 may be opened, which allows the bellows 50 to communicate with the pressure under diaphragm 131. If the pressure previously within the bellows 50 differs from the pressure under the diaphragm, such difference is quickly neutralized. For example, any decrease of pressure resulting from opening valve 137 momentarily lets body 140 get closer to the nozzle, which immediately raises the pressure again, and so forth, so that finally, the pressure in bellows 50 is equal to the pressure under diaphragm 131.

It is evident that body 140 has just two positions, one as shown in FIG. 5 and the other just described, wherein it is throttling nozzle 138. Each position is always the same, as a practical matter. Thus, in the former, diaphragm 141 and body 20 are solidly butted together (and rigidly, in effect, since the slight compressibility permitted by the diaphragm has negligible effect on position). In the latter, body 140 cannot possibly get closer to nozzle 138 than about the thickness of diaphragm 131. Further, the throttling effect totally disappears if the diaphragm 131 gets two-thousandths of an inch or so from the nozzle. This means that the lower position of body 140 never varies more than about a thousandth of an inch, regardless of the downward force on it.

The distance between the two positions is manY times one or two thousandths, therefore, when the body 141 moves down it precisely defines two volumes. The one volume is that existing at the instant the valves 30 and 40 sealingly seat in the upper ends of bores 32 and 42, respectively. Up to this point, centrifugal pump 80 has been pumping fluid from the liquid source via conduit 45, chamber 41, bore 42 and bore 47. It has also been returning liquid to the source via bore 37, bore 32, chamber 31 and conduit 35. Further, liquid has been returned to the source at the same rate as it was taken from it. Finally, the bores, chambers, conduits, and pump have been solidly-filled with liquid, i.e., no free gas is present.

However, the instant the valves seat, egress and ingress of liquid ceases. By this time diaphragm 141 has pulled away some distance from the lower face of body 20 (heretofore the diaphragm 141 seating over the lower end of the body 20 has sealed the lower ends of bores 32 and 42, analogous to the action of valve 10, FIG. 1, or the action of piston 14, FIG. 3). The pump circulates liquid between bores 32 and 42 via the space now existing between diaphragm 141 and the lower end of body 20. Hence, at the said instant, a sample of liquid of precisely determined volume is created, which solidly fills the closed volume existing at that instant.

However, at this same said instant, body 140 has still some distance to go before it begins to throttle nozzle 138, so it continues to move down, but now that valves 30 and 40 are closed, the amount of liquid has to remain the same as it was when the valves closed. Since the volume containing this liquid continues to increase, a vapor space is created, and continued operation of the pump agitates the liquid sample so that very shortly a gas/liquid equilibrium is reached with a precisely determined volume of liquid sample plus vapor space.

It will be observed that the device of FIGS. 5, 6 and 7 operates the same fundamentally as the devices of FIGS. 1 through 4. However, the operation of the device of FIGS. 5, 6 and 7 is essentially automatic. Thus, sample taking and producing the equilibrium mixture of gas and liquid requires only the opening of valve 136. Since making the pressure measurement requires only the further act of opening valve 137, it is evident that making the device fully automatic requires merely a simple time-programmed device to open and close valves 136 and 137, at suitable intervals. Furthermore, since these intervals can be relatively small (for example, 20 seconds long), the measurement of gas content is continuous for all practical purposes, especially when compared to previous ways of measuring gas content of liquid.

Of itself, the pressure measurement is, of course, not sufficient as a measurement of gas content, because temperature, as always, has to be taken into account, which can be done in several ways. For example, the device of FIGS. 5, 6 and 7 could be provided with means for automatically maintaining it at a constant given temperature and holding the sample, after opening valve 136, long enough to bring the sample to the given temperature, before opening valve 137. Or, instead of keeping a given temperature, the sample would be held long enough to come to temperature equilibrium, at which time its temperature would be measured.

In this instance, we take the latter approach. Thus, reference numeral 60 represents the temperature sensing element of a temperature transmitter 61 which, via a linkage 62, modifies the action of mechanism M so that this last produces an indication, control effect, or the like, taking into account both equilibrium temperature and pressure of the sample. In other words, mechanism M is in essence a computer which responds to measures of these temperatures and pressures to provide a measure of gas content.

The foregoing description is in terms of mechanical and pneumatic entities. However, electrical and other entities would be useful in certain phases of the invention. For instance, the measures of pressure and/or temperature can, at some point between sensing and utilization, be electrical in nature, with the result that mechanism could be a pure electrical device, with no moving parts, or perhaps an electromechanical hybrid of some sort. Again, pneumatic pressure is not the only energetic entity capable of exerting a balancing force. There are also hydraulic pressure, magnetic and other devices for doing the same. Again, balancing the force due to evolved gas pressure is not the only way of measurinG such pressure. Thus, in the device as shown, neither the sample volume nor increase in sample volume would be none the less precisely defined if the body 140 were allowed to bottom on the bottom of body 130, in which case one might simply attach a pressure gauge to the sample volume to measure equilibrium pressure.

Figure 8:
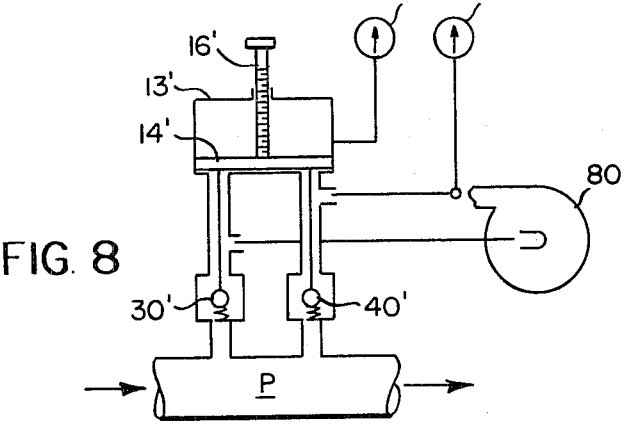
FIG. 8 shows a variant of the invention as shown in FIGS. 5, 6 and 7.

FIG. 8 illustrates some of the foregoing features, and as well, the fluid circuit of the FIGS. 6, 7 and 8 form of invention as compared to the forms shown in FIGS. 1 through 4. Thus, as will be seen from the disposition of valves 30' and 40' (corresponding to valves 30 and 40) and the associated conduitry, the only significant fluid circuit difference is that in FIG. 8, when valves 30' and 40' close (by virtue of piston 14' being moved up), the trapped sample is circulated around a closed loop. This is a more natural way of using a pump, i.e., in FIGS. 1 through 4, a special connection to the internal volume of the pump is implied, which may or may not be convenient or practical, depending on the pump.

Piston 14', cylinder 13' and piston rod 16' correspond to elements 14, 13 and 16 of FIGS. 3 and 4, respectively. Rod 16' is shown as threaded and as having a knob for rotating for the purpose of moving piston 14' up and down, in controlled fashion. Also, a pressure gauge 86 is shown connected to the cylinder 13', and a temperature gauge 87 is shown for measuring the temperature in the outlet of pump 80. Pressure gauge 86 may be of any known type the connections of which to the the pressure source (here, the space within cylinder 13'), of which the pressure is to be measured, does not admit any significant quantity of fluid from the source.

To use the invention shown in FIG. 8, one would simply elevate piston 14', by reason of rod 16', to a predetermined point above the connection to gauge 86, and read the two gauges after equilibrium of the trapped sample is attained. Operation is exactly like that of the form shown in FIGS. 5, 6 and 7, except for the manner of moving the piston, and making the pressure measurement.

Typical parameters of the invention as shown in FIGS. 5, 6 and 7 are as follows:

| | |
|---|---|
| Ratio of areas of diaphragms 131 and 141 | 1:4 |
| Ratio of sample volume at instant valves 30 and 40 close to sample volume when nozzle 138 is throttled by piston 140 | 1:1.03 |
| Beverage line pressure (typical) | 160 psig |
| Supply pressure (source 135) | 20 to 40 psig |
| Sampling period | 20 secs. |

The "20 to 40 psig" specification supra reflects an actual practice wherein valve 136 is provided with an extra way to which is connected a 40 psig supply pressure, and, instead of merely closing to move diaphragm 131 and body 140 up, instead connects the 40 psig supply pressure to the nozzle 138, thereby speeding the upward movement. The 20 psig supply is, as its showing indicates, connected to the body 130 via a restriction, so now the pressure on diaphragm 131 becomes 40 psig. When, the valve 136 vents, the 40 psig is cut-off from the nozzle, the 20 psig supply then provides the pressure for balancing the evolved gas pressure.

Considered in the broad, our invention has the novel and substantial merit of providing what amounts to a continuous way of accurately and reliably determining gas content of liquid, which is especially useful where the liquid is a potable contained under pressure in a closed system. Thus, the liquid is sampled frequently and returned to the system without loss or contamination, indeed, in a sense, the liquid sample never leaves the system. Further, our disclosed specific structural realization of the broad invention is supremely simple and ingenious. While claims appended hereto have, therefore, been drafted to capture the invention both in broad and in narrow, it is to be understood that in either case, the detailed description is intended as exemplary and not as limiting.

We claim:

1. A gas-content-of-liquid measuring device comprising, in combination,
    a first chamber having a first interior space;
    a second chamber having a second interior space;
    first means, said first means being associated with said first chamber, having a first state and a second state, and being operable from either thereof to the other;
    second means, said second means being associated with said second chamber, having a first state and a second state, and being operable from either thereof to the other;
    an impeller in said first interior space for exerting mechanical forces on liquid in said first interior space for impelling said liquid from a first place in said first interior space to a second place, said second place being in said first interior space but removed from said first place;
    said first means including liquid conducting means providing a passage conducting liquid between said first place and a third place external to said spaces, and providing a passage for conducting liquid between said second place and said third place;
    said first state of said first means being one in which both said passages are simultaneously open, and the said second state thereof being one in which both said passages are closed;
    said first state of said second means being one in which said said interior space of said second chamber is isolated from said interior space of said first chamber, and said second state thereof being one in which said second means provides for effectively interconnecting said interior spaces for conduction of fluid therebetween.

2. The measuring device of claim 1 in combination with control means for sequentially causing both said first states to exist simultaneously with each other and then causing both said second states to exist simultaneously with each other.

3. The measuring device of claim 1, including a centrifugal pump,
    said pump having a rotor, a rotor chamber having third interior space containing said rotor, an inlet providing a passage for separately conducting fluid from said first place to the said third interior space, and an outlet for separately conducting fluid to said third place from said third interior space;
    said rotor being said impeller, and said first interior space including the said third interior space.

4. The measuring device of claim 1, wherein said second chamber includes a cylinder having interior space and said second means includes a piston in said cylinder's interior space movable from one end of said cylinder to the other thereof; said one end of said cylinder having a passage connected to said first interior space for conducting fluid between said first interior space and the said interior space of said cylinder;
    said piston, when at said one end of said cylinder, defining substantially zero volume of said cylinder's interior space connected to said first interior space, whereby to define said first state of said second means; and said cylinder, when at said other end of said cylinder, connecting said interior space of said cylinder to said first interior space, whereby to define said second state of said second means.

5. The measuring device of claim 4, wherein said other end of said cylinder has a piston detector for detecting the position of said piston in said cylinder with respect to said other end of said cylinder; said other end of said cylinder also having force exerting means responsive to said piston detector for exerting just so much force on said piston as is necessary to prevent said piston from moving more than a given predetermined distance from said one end; and means for measuring said force.

6. The measuring device of claim 5, wherein said force exertinG means includes means for applying fluid pressure between said other end of said cylinder and said piston for exerting said force on said piston, said piston detector being responsive to said piston to regulate said force for maintaining said piston at said given predetermined distance from said one end.

7. The measuring device of claim 1, wherein said second means includes structure of said chamber adapted in said first state of said second means to make said second interior space substantially zero volume, and adapted in said second state of said second means to make said second interior space have a predetermined, non-zero volume.

8. In a gas-content-of-liquid measuring device of the type having an interior space for containing fluid under pressure, sensing means for sensing said pressure, agitating means for agitating liquid in said interior space and sampling means for introducing a liquid sample into said interior space for agitation by said agitating means, the improvement wherein said agitating and sampling means is a pump and control means for causing said pump to sample by pumping a liquid sample into said interior space and to agitate by pumping such liquid sample while same is in said interior space, and for causing the said sample to be confined in said interior space while being so agitated.

9. The invention of claim 8, wherein said pump has an exhaust and an intake, said control means having a first state wherein it connects said intake to a source of liquid, and said exhaust to said interior space, and a second state wherein it instead connects both said intake and said exhaust to said interior space.

10. The invention of claim 9, wherein said pump is a centrifugal pump.

11. The invention of claim 9, wherein said control means in said first state also connects said interior space to said source for allowing said pump to pump liquid from said source, through said interior space, and back to said source, and in said second state instead closes said interior space off from said source.

12. The invention of claim 11, wherein said pump is a centrifugal pump.

* * * * *